(12) United States Patent
Mizukawa

(10) Patent No.: US 6,227,026 B1
(45) Date of Patent: May 8, 2001

(54) BAND-BLADE CUTTING TOOL AND BAND-BLADE WORKING APPARATUS

(76) Inventor: Suehiro Mizukawa, 4-25 Torikainishi 5-chome, Settsu-shi, Osaka-fu (JP)

( * ) Notice: Subject to any disclaimer, the term of this patent is extended or adjusted under 35 U.S.C. 154(b) by 0 days.

(21) Appl. No.: 09/317,938

(22) Filed: May 25, 1999

(30) Foreign Application Priority Data

Jun. 3, 1998 (JP) ................................................. 10-154527

(51) Int. Cl.$^7$ ................................................. B21D 43/28
(52) U.S. Cl. ................................. 72/294; 30/229; 83/607
(58) Field of Search ................................ 72/294; 30/229, 30/230, 178; 83/607, 610

(56) References Cited

U.S. PATENT DOCUMENTS

| | | | | |
|---|---|---|---|---|
| 2,000,852 | * | 5/1935 | Langbein | 30/230 |
| 2,255,812 | * | 9/1941 | Rickman | 83/610 |
| 5,419,045 | * | 5/1995 | Magdich | 30/229 |
| 5,428,982 | * | 7/1995 | Hinterlechner | 72/452.4 |
| 5,461,893 | * | 10/1995 | Tyler | 72/294 |
| 5,771,725 | * | 6/1998 | Mizukawa | 72/294 |

* cited by examiner

*Primary Examiner*—Daniel C. Crane
(74) *Attorney, Agent, or Firm*—Jones, Tullar & Cooper, P.C.

(57) ABSTRACT

The present invention relates to a band-blade cutting tool which is used for cutting a band blade that is a so-called Thomson blade, and also to a band-blade working apparatus having a function of cutting such a band blade into a predetermined shape and like functions. A band-blade cutting tool has: a pair of edged members having cutting blades; miter-cutting portions M which are disposed on the cutting blades to obliquely cut a blade portion of a band blade; straight-cut portions S which straight cut the blade portion of the band blade; and the like. The band-blade working apparatus has a bending mechanism a pair of band-blade cutting tools and the like. The pair of band-blade cutting tools are distributedly placed in the front and rear sides of the bending mechanism.

13 Claims, 13 Drawing Sheets

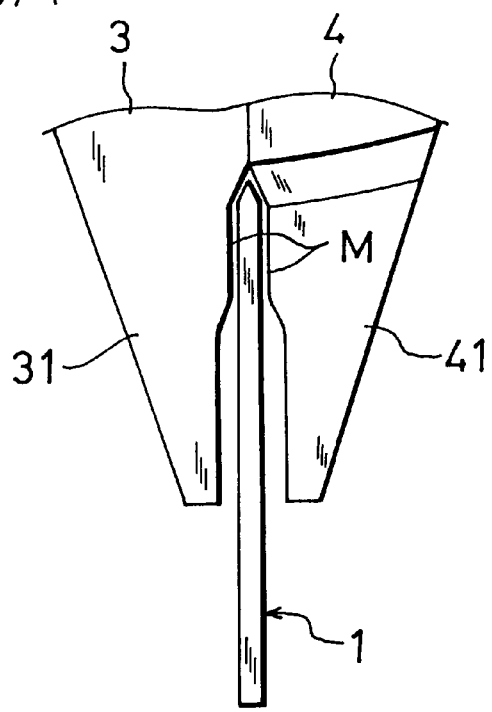
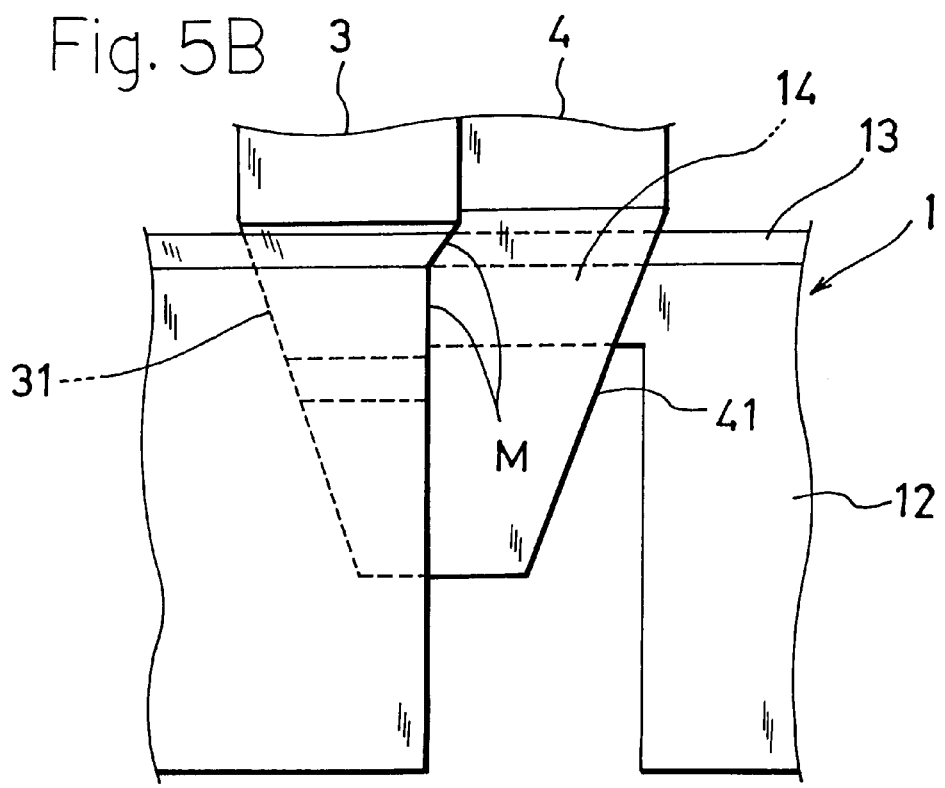

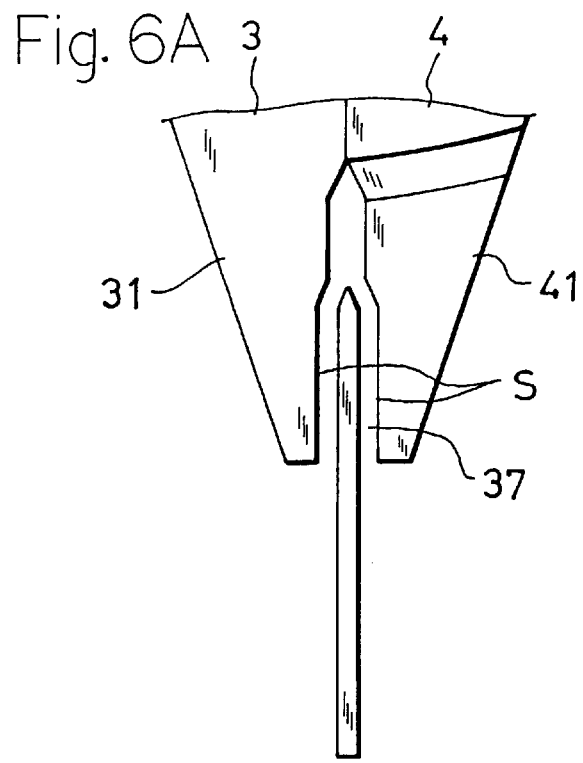
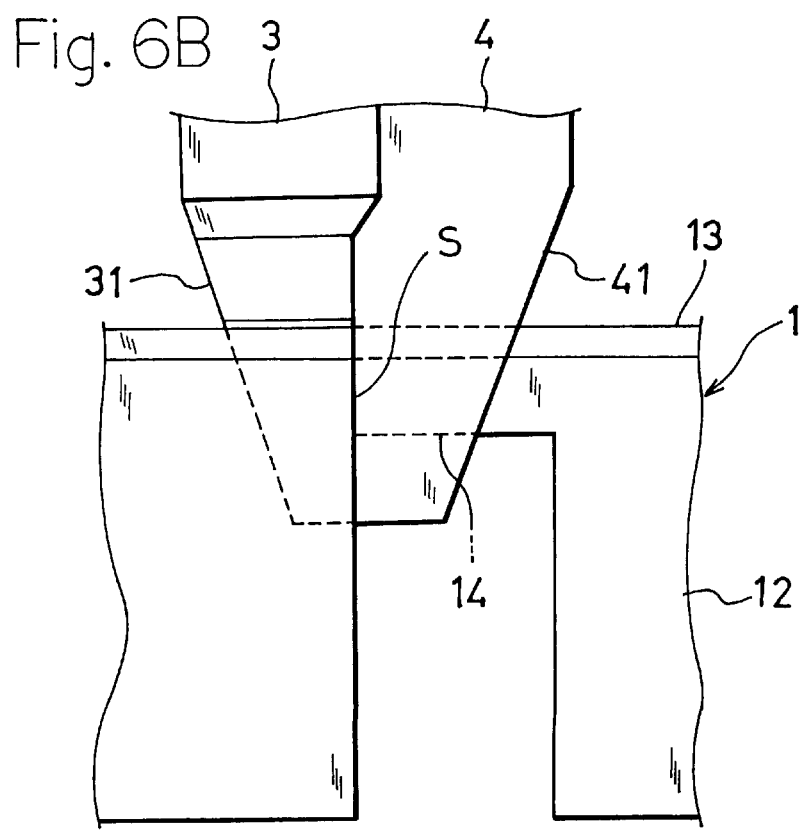

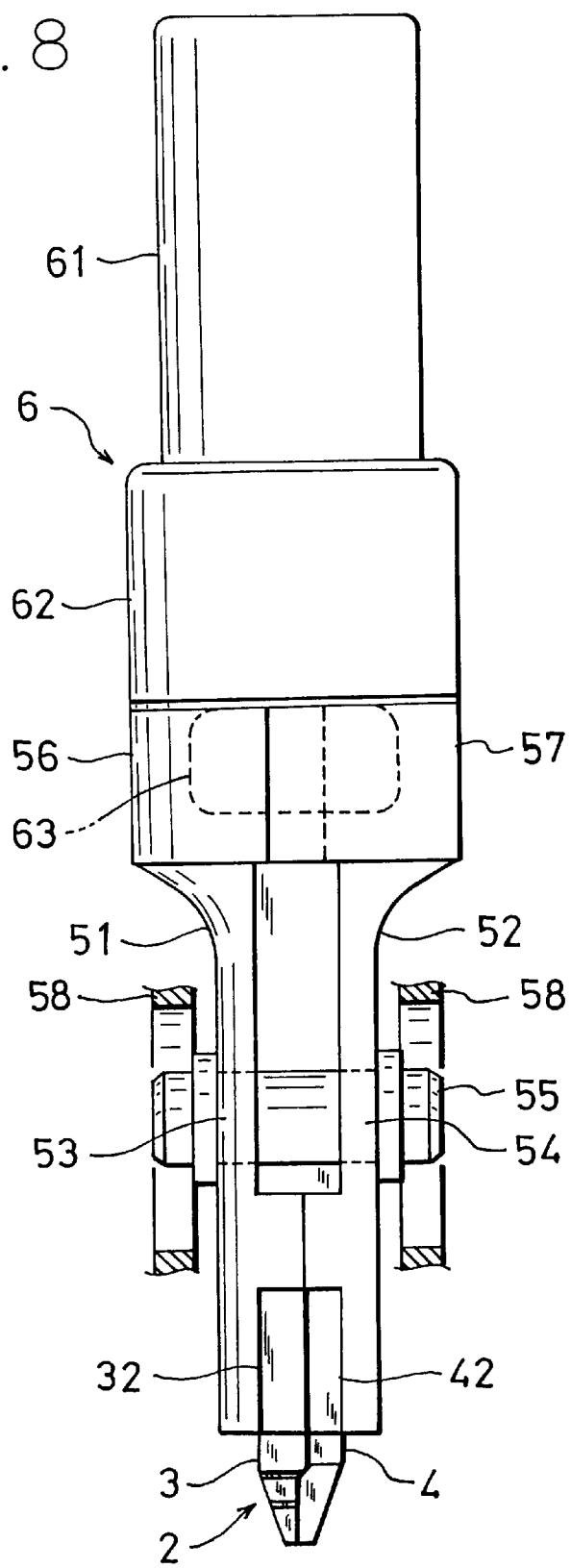

BAND-BLADE CUTTING TOOL AND BAND-BLADE WORKING APPARATUS

BACKGROUND OF THE INVENTION

1. Field of the Invention

The present invention relates to a band-blade cutting tool which is used for cutting a band blade that is a so-called Thomson blade, and also to a band-blade working apparatus having a function of cutting such a band blade into a predetermined shape and like functions.

2. Description of the Prior Art

As shown in FIGS. 12A and 13, a band blade 1 which is a so-called Thomson blade has an sharp blade portion 13 in one edge in the width direction of a strip-like ridge portion 12. The band blade 1 is subjected to necessary workings and then used in, for example, formation of breaks or a fold in a paper piece, a paper sheet, a wood piece, or the like. In addition to working the band blade 1 to form it into a predetermined shape, workings which may be applied to the band blade 1 include: working of punching given portions of the ridge portion 12 of the band blade 1 into a rectangular shape to form bridges 14 in the ridge portion 12 as shown in FIG. 12B; and that of cutting away the bridges 14 as shown in FIG. 12C. The cutting of the bridges 14 may be conducted by, for example, so-called miter cutting in which, as shown in the XIVa portion in FIG. 12C and in FIG. 14A, the blade portion 13 is obliquely crossly cut so that one cut end 13a has the same inclination angle θ2 as the inclination angle θ1 (see FIG. 13) of the side face of the blade portion 13, or so-called straight cutting in which, as shown in the XIVb portion in FIG. 12C and in FIG. 14B, the blade portion 13 is cut perpendicular to the blade edge so that both cut ends 13c have a straight end face. As shown in FIG. 15, for example, the band blade 1 which has undergone miter cutting is placed so that the cut end 13a of the blade portion 13 is tightly butted against a side face of a blade portion 13' of another band blade 1' serving as a counter member.

Conventionally, when miter cutting and straight cutting are to be executed, different band-blade cutting tools each having a cutting blade of a shape corresponding to miter cutting or straight cutting are used.

However, execution of miter cutting and straight cutting by using different band-blade cutting tools has a drawback in that different mechanisms for respectively driving the band-blade cutting tools must be separately prepared. When such a band-blade cutting tool is incorporated into a band-blade working apparatus having functions such as that of bending a band blade so that the apparatus is further provided with a cutting function, the number of incorporated band-blade cutting tools is increased, thereby producing a problem in that the increased number of band-blade cutting tools impedes miniaturization of a band-blade working apparatus.

SUMMARY OF THE INVENTION

The present invention is derived from a consideration of the above-discussed circumstances and problems. It is an object of the present invention to provide a band-blade cutting tool which can perform both miter cutting and straight cutting.

It is another object of the present invention to provide a band-blade working apparatus in which, when a long band blade is to be cut so as to produce a band blade of a predetermined length and having ends that are miter-cut, the amount of movement of the long band blade that is required for connecting the front and rear ends of the band blade to each other can be reduced so that production efficiency can be enhanced.

It is a further object of the present invention to provide a band-blade working apparatus in which, when a band blade of a predetermined length is to be produced by bending a long band blade or cutting a bent long band blade, the production steps can be easily automated.

The present invention is directed to a band-blade cutting tool for cutting a band blade.

The band-blade cutting tool comprises: a pair of edged members which are opened and closed; cutting blades which are respectively disposed on the pair of edged members; miter-cutting portions which are respectively disposed on the cutting blades to obliquely crossly cut a blade portion of a band blade; and straight-cut portions which are respectively disposed on the cutting blades to straight cut the blade portion in a width direction of the band blade.

In the band-blade cutting tool, the miter-cutting portions which are respectively disposed on the cutting blades of the pair of edged members are used in miter cutting, and the straight-cut portions are used in straight cutting.

Preferably, in each of the cutting blades, the miter-cutting portion and the straight-cut portion are continuously formed in adjacent places of the cutting blade.

According to this configuration, by adjusting the movement amount of the band-blade cutting tool in remote and close directions with respect to the band blade, it is possible to select whether miter-cut working is conducted by the miter-cutting portions or straight-cut working is conducted by the straight-cut portions.

The band-blade cutting tool of the present invention may be configured so that arm portions are continuously integrated with the pair of edged members, respectively, the arm portions are swingably coupled to each other via a support shaft in places where the arm portions are continuously integrated with the edged members, and a cutting tool driving mechanism which opens and closes the pair of edged members about the support shaft via the arm portions is coupled to a free end portion of each of the arm portions. Preferably, the cutting tool driving mechanism has a rotating cam, and sliding members which are respectively disposed on the free end portions of the arm portions and correspond to the rotating cam.

According to this configuration, the arm portions which are continuously integrated with the pair of edged members, respectively are opened and closed by the cutting tool driving mechanism, whereby the pair of edged members are opened and closed about the support shaft. The cutting tool driving mechanism having the rotating cam has an advantage that the operation is surely conducted.

The present invention is directed also to a band-blade working apparatus which performs bending and cutting of a band blade.

The band-blade working apparatus comprises:

a bending mechanism which bends a band blade;

a band-blade cutting tool which cuts the band blade;

a pair of edged members which are disposed in the band-blade cutting tool and which are opened and closed;

cutting blades which are respectively disposed on the pair of edged members;

miter-cutting portions which are disposed on the cutting blades, respectively, to obliquely crossly cut a blade portion of the band blade and straight cut a ridge portion of the band blade from a root portion of a cut part of the blade portion in a width direction of the band blade; and straight-cutting portions which are formed continuously with the miter-cutting portions and disposed on the cutting blades, respectively, to straight cut the blade portion and the ridge portion in the width direction.

Preferably, the band-blade working apparatus comprises a pair of band-blade cutting tools, the band-blade cutting tools are distributedly placed in the front and rear sides so that cut parts of the blade portion which is cut by the miter-cutting portions are oppositely inclined, and at least a front one of the front band-blade cutting tools is placed in front of the bending mechanism. In this case, preferably, the pair of band-blade cutting tools are distributedly placed in the front and rear sides of the bending mechanism. According to this configuration, the band-blade working apparatus can be easily miniaturized.

In the band-blade working apparatus of the present invention, a band blade is bent by the bending mechanism, and then cut by one of the pair of band-blade cutting tools which are distributedly placed in the front and rear sides. According to the configuration in which at least the front band-blade cutting tool is placed in front of the bending mechanism, even in the case where, after a band blade is bent by the bending mechanism, there may arise a situation in which the band blade cannot be retracted to the rear side of the bending mechanism, the band blade can be cut by using the front band-blade cutting tool and without retracting the band blade to the rear side of the bending mechanism. As the bending mechanism, for example, a mechanism having a slit-like opening through which the band blade is to be passed, and a movable member which laterally presses the band blade passed through the opening to bend the band blade may be used.

In the band-blade working apparatus of the present invention, a bridge punching mechanism which applies punching to the ridge portion of the band blade to form a bridge in the ridge portion may be placed in the rear of the band-blade cutting tool which is placed in the rear side.

According to this configuration, the band-blade working apparatus which can bend and cut a band blade and punch a bridge in the band blade can be easily miniaturized. When a bridge is formed in a band blade by the bridge punching mechanism and cutting by the band-blade cutting tool is conducted in the place of the bridge, there arises an advantage that the band blade can be easily cut.

Preferably, the band-blade working apparatus of the present invention further comprises a reciprocal driving mechanism which extracts and retracts the band blade in an anteroposterior direction.

According to this configuration, the band blade can be extracted and retracted in the anteroposterior direction by controlling the reciprocal driving mechanism.

Preferably, the apparatus further comprises an elevation driving mechanism which raises and lowers the pair of front and rear band-blade cutting tools with respect to a movement path of the band blade that is extracted and retracted by the reciprocal driving mechanism. Preferably, the elevation driving mechanism has a function of positioning the miter-cutting portions of the pair of front and rear band-blade cutting tools with respect to the movement path of the band blade, and a function of positioning the straight-cutting portions of the band-blade cutting tools.

According to this configuration, it is possible to easily select whether a band blade is miter-cut by the miter-cutting portions or straight-cut by the straight-cutting portions.

In the band-blade working apparatus of the present invention, preferably, a chute which recovers cut pieces of the band blade is disposed below the band-blade cutting tool which is placed in the rear side, and the bridge punching mechanism.

According to this configuration, cut pieces which are produced when a band blade is cut by the rear band-blade cutting tool or a bridge is formed in a band blade by the bridge punching mechanism are recovered by the chute. As described above, according to the present invention, a band-blade cutting tool which can preform both miter cutting and straight cutting can be provided, and a band-blade working apparatus having functions such as that of cutting and bending a band blade can be provided.

BRIEF DESCRIPTION OF THE DRAWINGS

FIG. 5A is a diagram of miter cutting as seen from the front side;

FIG. 5B is a diagram of miter cutting as seen from a lateral side;

FIG. 6A is a diagram of straight cutting as seen from the front side;

FIG. 6B is a diagram of straight cutting as seen from the lateral side;

FIG. 8 is a side view of the band-blade cutting tool to which the cutting tool driving mechanism is coupled;

DETAILED DESCRIPTION OF THE PREFERRED EMBODIMENT

Figure 1:
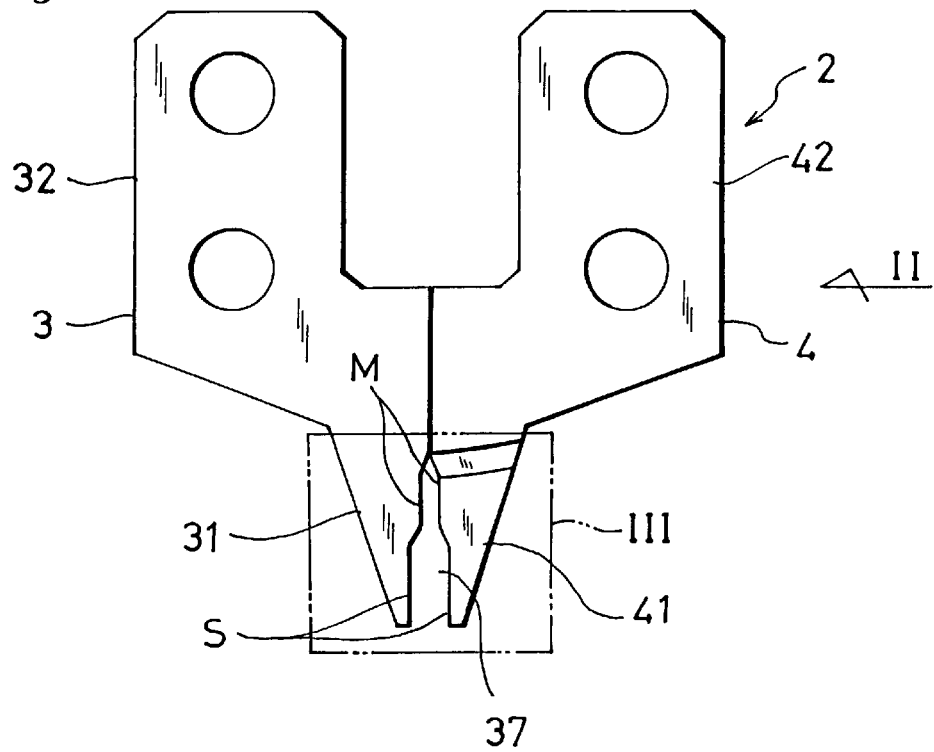
FIG. 1 is a front view of an embodiment of the band-blade cutting tool of the present invention.
Figure 2:
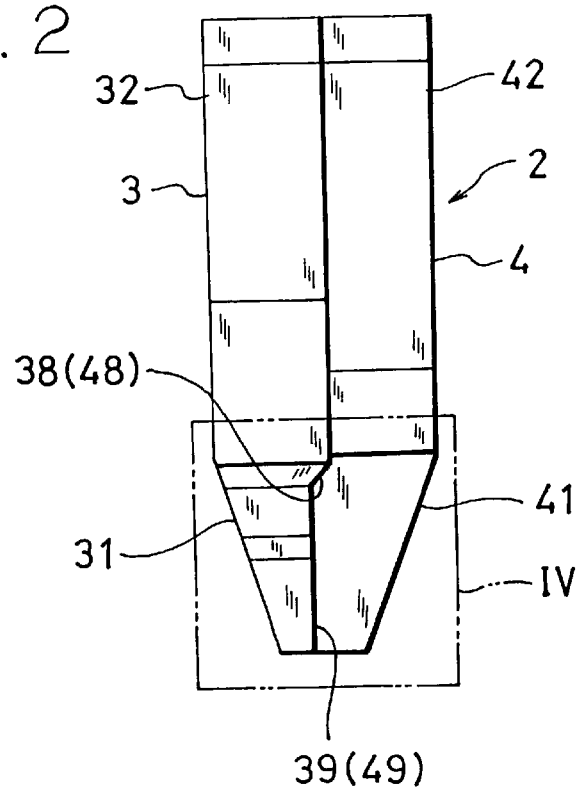
FIG. 2 is a view looking in the direction of the arrow II of FIG. 1.
Figure 3:
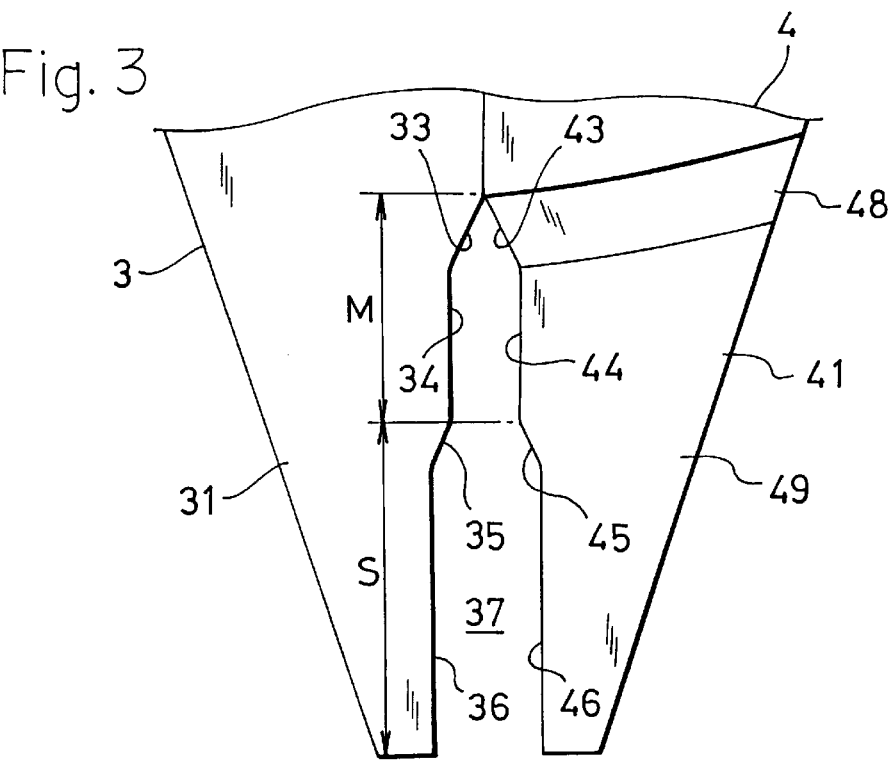
FIG. 3 is an enlarged view of portion III of FIG. 1.
Figure 4:
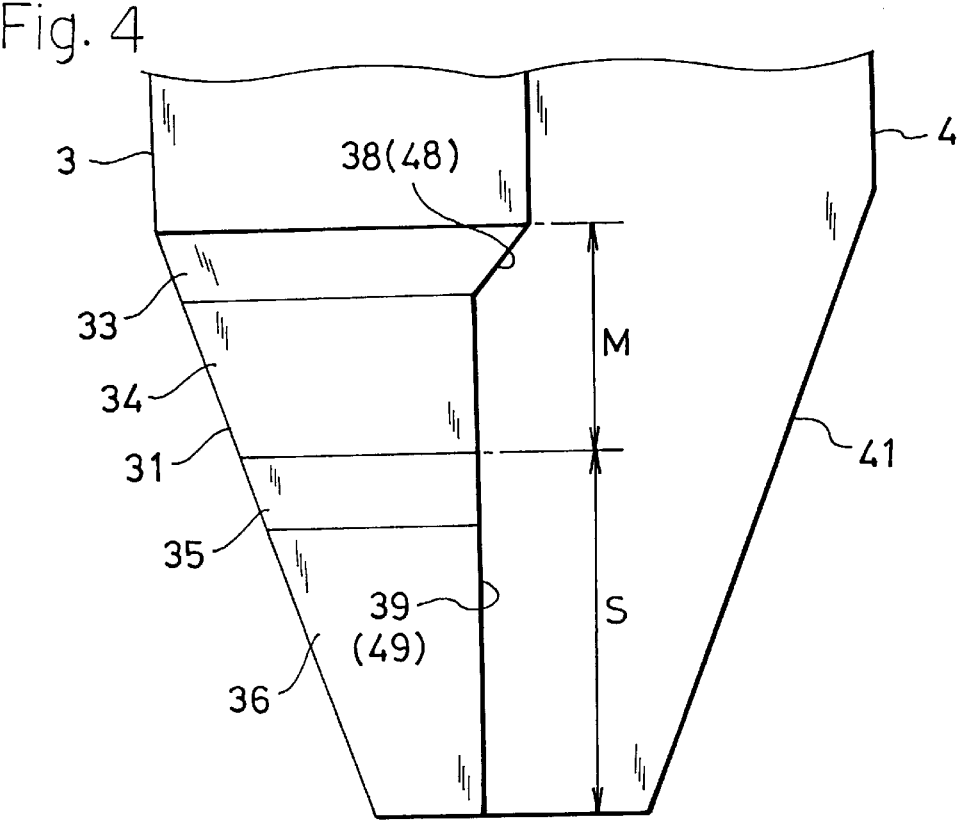
FIG. 4 is an enlarged view of portion IV of FIG. 2.
Figure 14A:
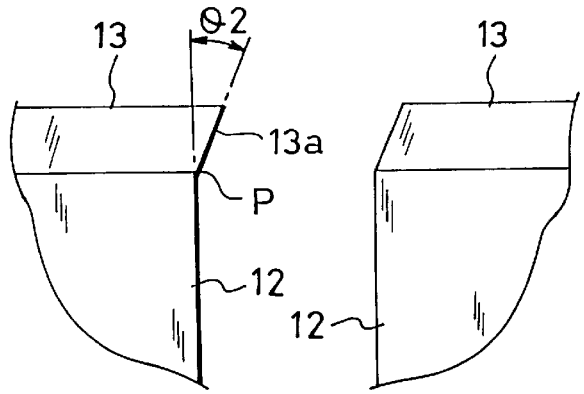
FIG. 14A is an enlarged view of portion XIVa of FIG. 12C.

A band-blade cutting tool 2 shown in FIGS. 1 to 4 has a air of left and right edged members 3 and 4 which are opened and closed. Cutting blades 31 and 41, and mounting pieces 32 and 42 are disposed on the edged members 3 and 4, respectively. As shown in FIGS. 3 and 4, each of the edged members 3 and 4 is partitioned into two sections in the longitudinal direction (the vertical direction in the figure). The upper section is formed as a miter-cutting portion M, and the lower section as a straight-cut portion S. The miter-cutting portions M are portions which, as shown in FIG. 14A, obliquely crossly cut a blade portion 13 of a band blade 1, thereby separating the band blade 1. In the embodiment shown, a ridge portion 12 can be straight cut in the width direction, when starting from an end point P of the oblique cut part. The end point P is positioned in an interface between the blade portion 13 and the ridge portion 12, or positioned when being slightly shifted from the interface. The straight-cut portions S are portions which straight cut the blade portion 13 in the width direction. In the embodiment shown, the straight-cut portions can straight cut also the ridge portion 12 in the width direction.

As shown in FIG. 3, the miter-cutting portions M have tying parts 33 and 43 which are inclined and elongated along the surface of the sharp blade portion 13 of the band blade 1 as seen in the front side, and linear parts 34 and 44 which are continuous with the tying parts. In the left and right edged members 3 and 4, the tying parts 33 and 43 and the linear parts 34 and 44 are symmetrically formed. Similarly, the straight-cut portions S have tying parts 35 and 45 which are inclined and elongated along the surface of the sharp blade portion 13 of the band blade 1 as seen in the front side, and linear parts 36 and 46 which are continuous with the tying parts. In the left and right edged members 3 and 4, the tying parts 35 and 45 and the linear parts 36 and 46 are symmetrically formed.

During an operation of cutting the band blade 1, the left and right edged members 3 and 4 are closed together while sliding over each other. As shown in FIGS. 1 and 3, when the left and right edged members 3 and 4 are opened, an open space 37 is formed in the miter-cutting portions M and the straight-cut portions S, so that a part of the band blade 1 to be cut can be placed in the open space 37. As shown in FIGS. 2 and 4, in the sliding faces of the left and right edged members 3 and 4, parts corresponding to the tying parts 33 and 43 of the miter-cutting portions M are formed as inclined faces 38 and 48, and the whole faces below the inclined faces 38 and 48 are formed as flat faces 39 and 49.

The cutting operation by the left and right edged members 3 and 4 of the band-blade cutting tool 2 will be described.

FIGS. 5A and 5B show the case where miter cutting is performed. In this case, the miter-cutting portions M of the left and right edged members 3 and 4 are opened, and a part of the band blade 1 to be cut (in the illustrated example, the left end of a bridge 14) in which the bridge 14 is previously formed is placed in the open space 37. Thereafter, the left and right edged members 3 and 4 are closed by using a certain mechanism (an example of the mechanism will be specifically described later). This causes the left and right edged members 3 and 4 to be closed together while sliding over each other, thereby cutting the part to be cut. As a result, the blade portion 13 of the band blade 1 is obliquely crossly cut and the ridge portion 12 is straight cut in the width direction, while starting from the end point P of the oblique cut part, or miter cutting which has been described with reference to FIG. 14A.

Figure 14B:
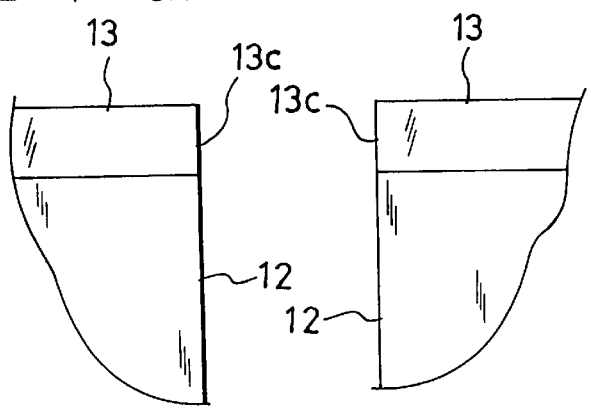
FIG. 14B is an enlarged view of portion XIVb of FIG. 12C.
Figure 15:
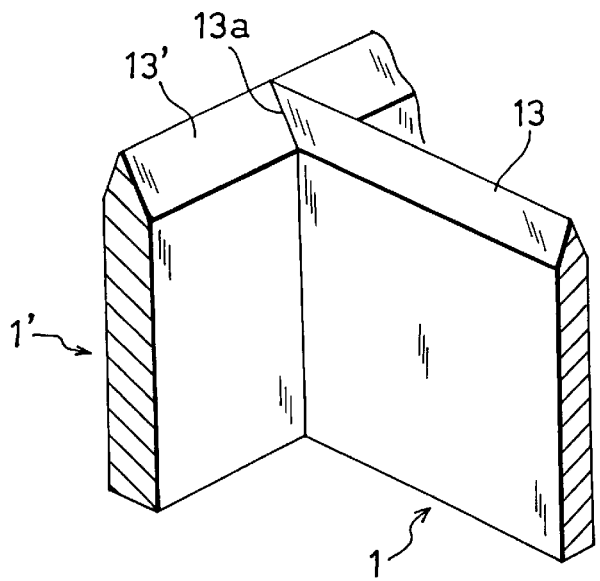
FIG. 15 is a partial perspective view showing an example of the use state of a band blade.

FIGS. 6A and 6B show the case where straight cutting is performed. In this case, the straight-cut portions S of the left and right edged members 3 and 4 are opened, and a part of the band blade 1 to be cut (in the illustrated example, the left end of a bridge 14) in which the bridge 14 is previously formed is placed in the open space 37. Thereafter, the left and right edged members 3 and 4 are closed by using a certain mechanism (an example of the mechanism will be specifically described later). This causes the left and right edged members 3 and 4 to be closed together while sliding over each other, thereby cutting the part to be cut. As a result, the blade portion 13 and the ridge portion 12 of the band blade 1 are straight cut in the width direction, or straight cutting which has been described with reference to FIG. 14B FIGS. 7 and 8 show a cutting tool driving mechanism 6, and FIGS. 9A and 9B show main portions of the cutting tool driving mechanism 6.

Figure 7:
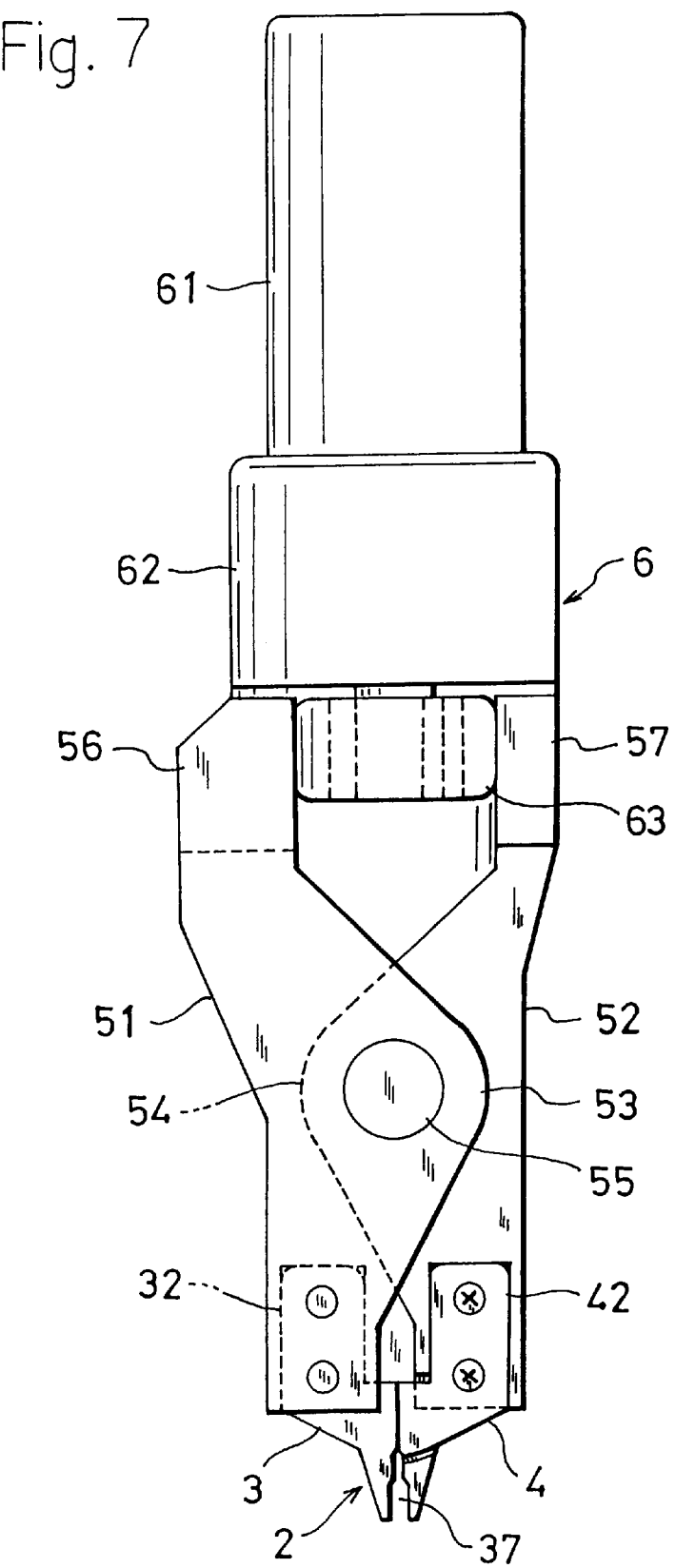
FIG. 7 is a front view of a band-blade cutting tool to which a cutting tool driving mechanism is coupled.

As shown in FIGS. 7 and 8, arm portions 51 and 52 are coupled to the mounting pieces 32 and 42 of the pair of left and right edged members 3 and 4, respectively. Bearing portions 53 and 54 which are respectively disposed in middle parts of the left and right arm portions 51 and 52 are coupled to each other by a support shaft 55 in a relatively swingable manner. Sliding members 56 and 57 are opposingly disposed on the upper free end portions of the left and right arm portions 51 and 52, so as to be separated from each other by a given distance, respectively. By contrast, although not directly shown, a rotation driving source 61 such as a pulse motor (hereinafter, referred to as "motor") is mounted on a support frame 58 which supports the support shaft 55. A rotating cam 63 is coupled to the rotation shaft of the motor 61 via a reduction mechanism 62. As shown in FIGS. 9A and 9B, in the rotating cam 63, the outer peripheral face serving as a cam face has an elliptic shape. The sliding members 56 and 57 are placed on both the sides of the cam face. The motor 61, the reduction mechanism 62, the rotating cam 63, and the sliding members 56 and 57 constitute the cutting tool driving mechanism 6 which opens and closes the left and right edged members 3 and 4 via the left and right arm portions 51 and 52. When a configuration having a rotating cam and sliding members is employed as the cutting tool driving mechanism 6, the configuration is not restricted to that shown in FIGS. 9A and 9B. For example, a configuration may be employed in which an eccentric cam is key-coupled to the rotation shaft of the motor 61, a ring cam (a bearing may be used) which is concentric with the eccentric cam is fittingly held on the eccentric cam so as to be slidably rotatable, and the sliding members 56 and 57 are disposed on both the sides of the ring cam.

Figure 9A:
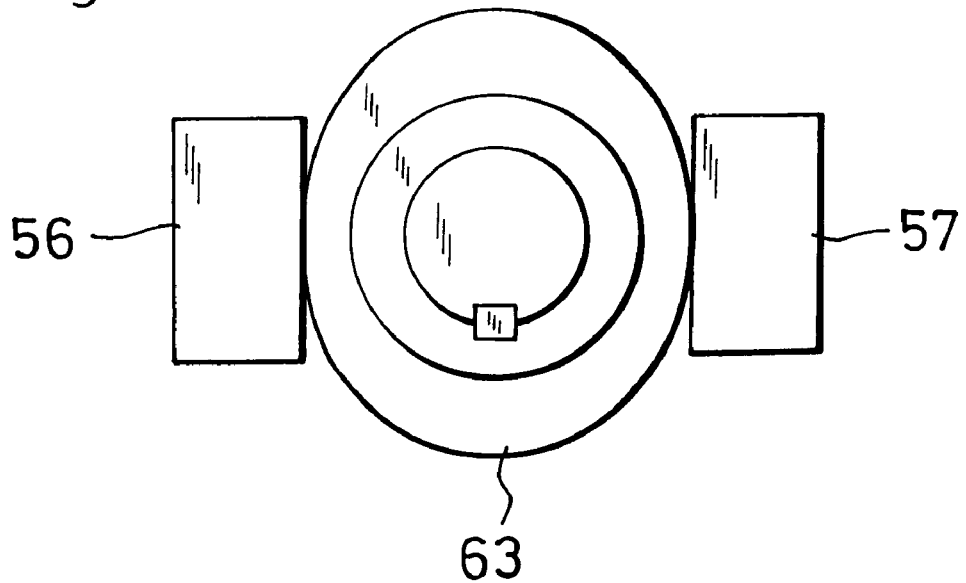
FIG. 9A is a diagram of main portions of the cutting tool driving mechanism.
Figure 9B:
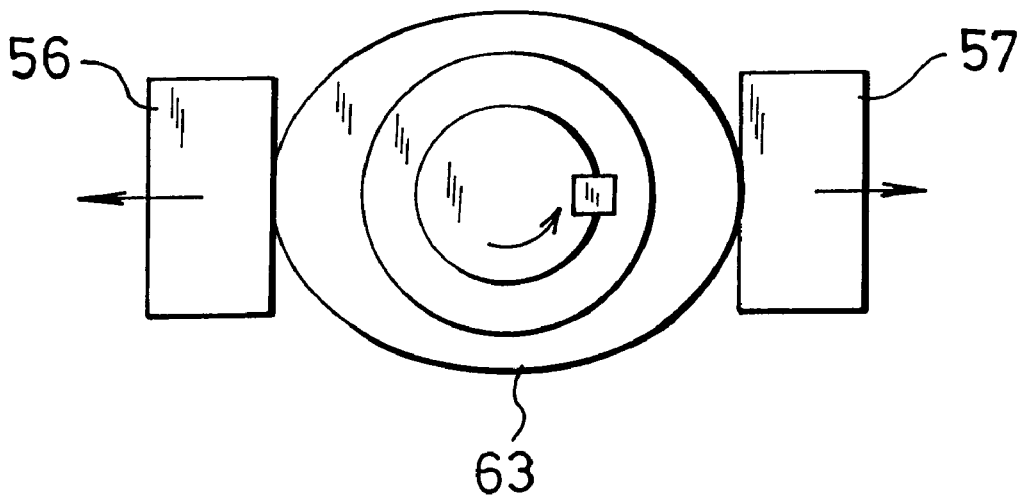
FIG. 9B is a diagram of main portions of the cutting tool driving mechanism.

When the minor axis direction of the rotating cam 63 coincides with the arrangement direction of the left and right sliding members 56 and 57 as shown in FIG. 9A, the left and right sliding members 56 and 57 are free so that the left and right edged members 3 and 4 of the band-blade cutting tool 2 are opened as shown in FIG. 7, and hence a band blade can be placed in the open space 37. Therefore, the band blade 1 can be placed in the miter-cutting portions M which have been described with reference to FIGS. 5A and 5B, or in the straight-cut portions S which have been described with reference to FIGS. 6A and 6B. When the major axis direction of the rotating cam 63 is made coincident with the arrangement direction of the left and right sliding members 56 and 57 as shown in FIG. 9B by controlling the rotation of the motor 61, the left and right sliding members 56 and 57 are pressed and opened by the rotating cam 63 as indicated by the arrows in the figure, and hence the left and right edged members 3 and 4 which have been opened are closed together while sliding over each other. As a result, for example, miter cutting which has been described with reference to FIGS. 5A and 5B, or straight cutting which has been described with reference to FIGS. 6A and 6B is performed on the band blade 1.

Figure 10:
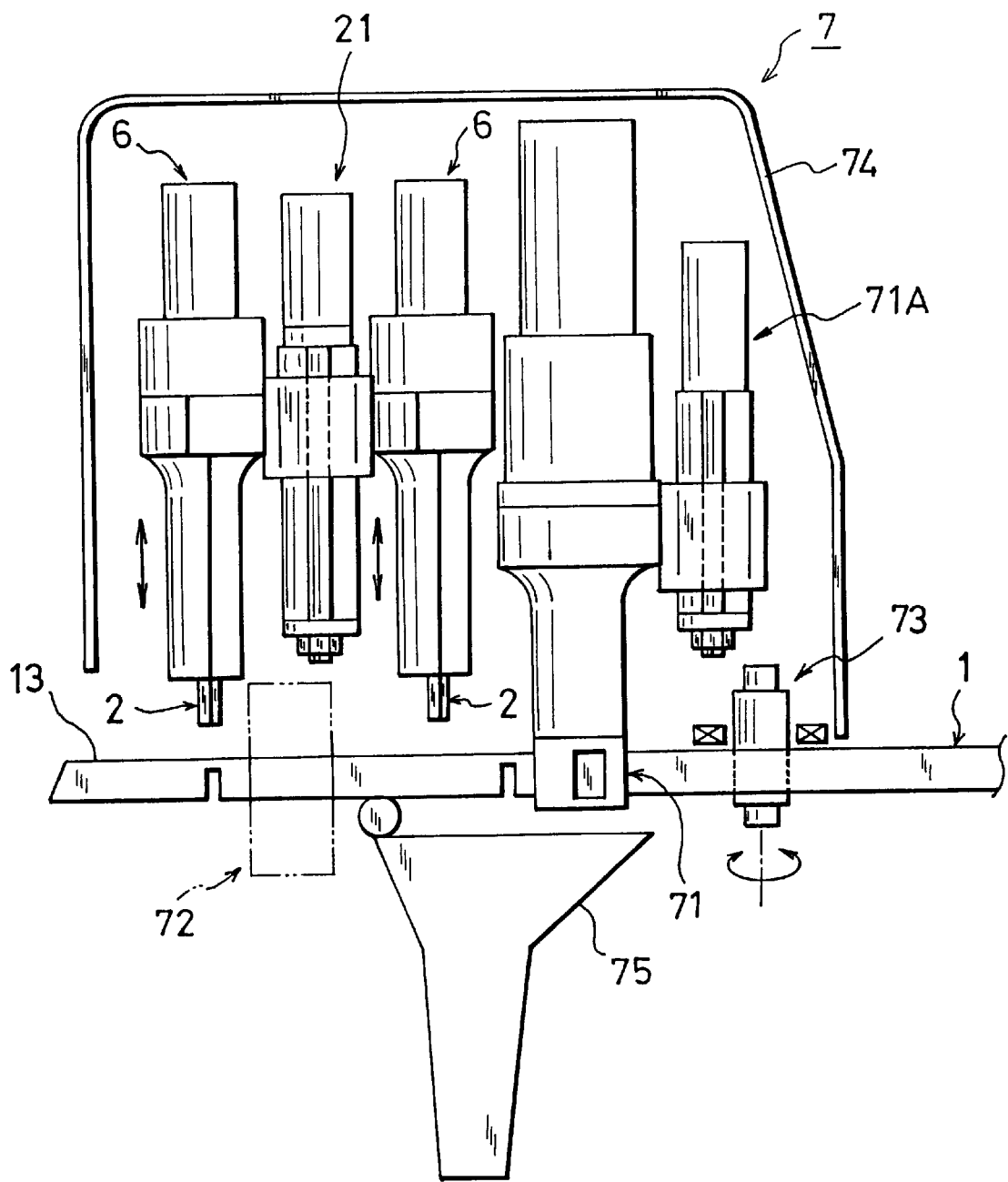
FIG. 10 is a diagram showing the configuration of a band-blade working apparatus.

FIG. 10 shows the band-blade working apparatus 7 of the present invention.

The band-blade working apparatus 7 comprises: a bridge punching mechanism 71; the band-blade cutting tool 2 to which the cutting tool driving mechanism 6 is coupled; a bending mechanism 72; and a reciprocal driving mechanism 73 which extracts and retracts the band blade 1 in the anteroposterior direction. These components are housed in a case 74. The apparatus further comprises a chute 75 which recovers cut pieces and which is disposed below the movement path of the band blade 1. The chute 75 is disposed below the band-blade cutting tool 2 which is placed in the rear side and the bridge punching mechanism 71.

The reciprocal driving mechanism 73 has a function of reciprocally moving the band blade 1 by a given distance in the forward or rearward direction along the movement path. For example, the reciprocal driving mechanism 73 may be configured by a pair of rollers which are rotated forward and rearward by a predetermined amount by a motor such as a pulse motor which is not shown. In this case, the band blade 1 which is pressingly held between the rollers is reciprocally moved in the longitudinal direction by a distance corresponding to the rotation amount of the rollers.

Figure 11:
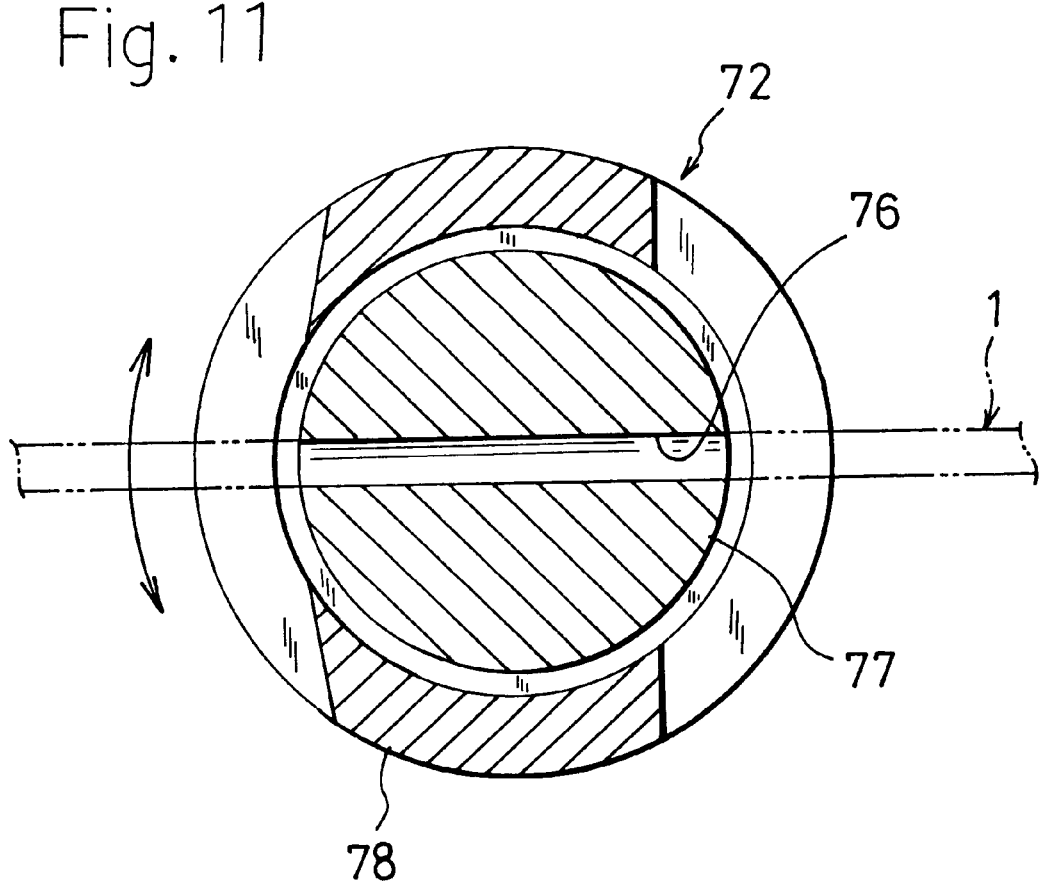
FIG. 11 is a cross section plan view of a bending mechanism.
Figure 12A:
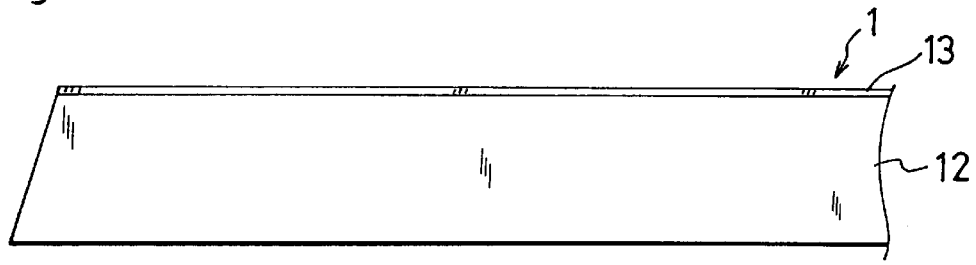
FIG. 12A is a partial side view of a band blade.
Figure 12B:
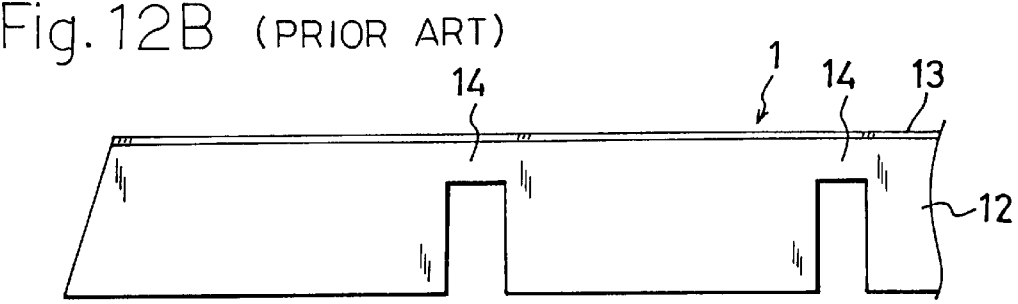
FIG. 12B is a partial side view of the band blade in which bridges are formed.
Figure 12C:
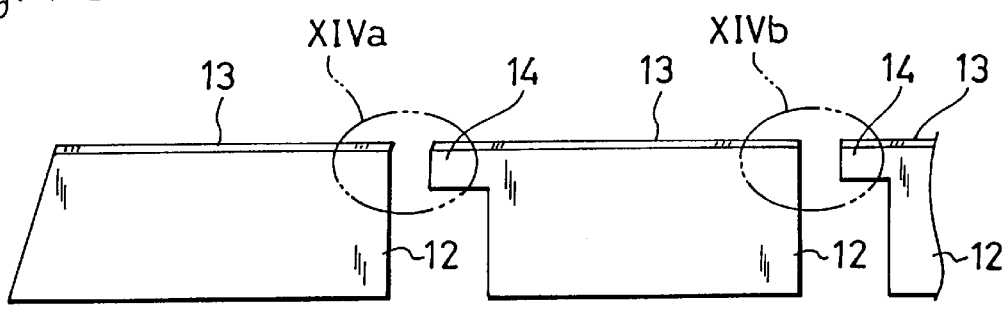
FIG. 12C is a partial side view of the band blade in which the bridges are cut.
Figure 13:
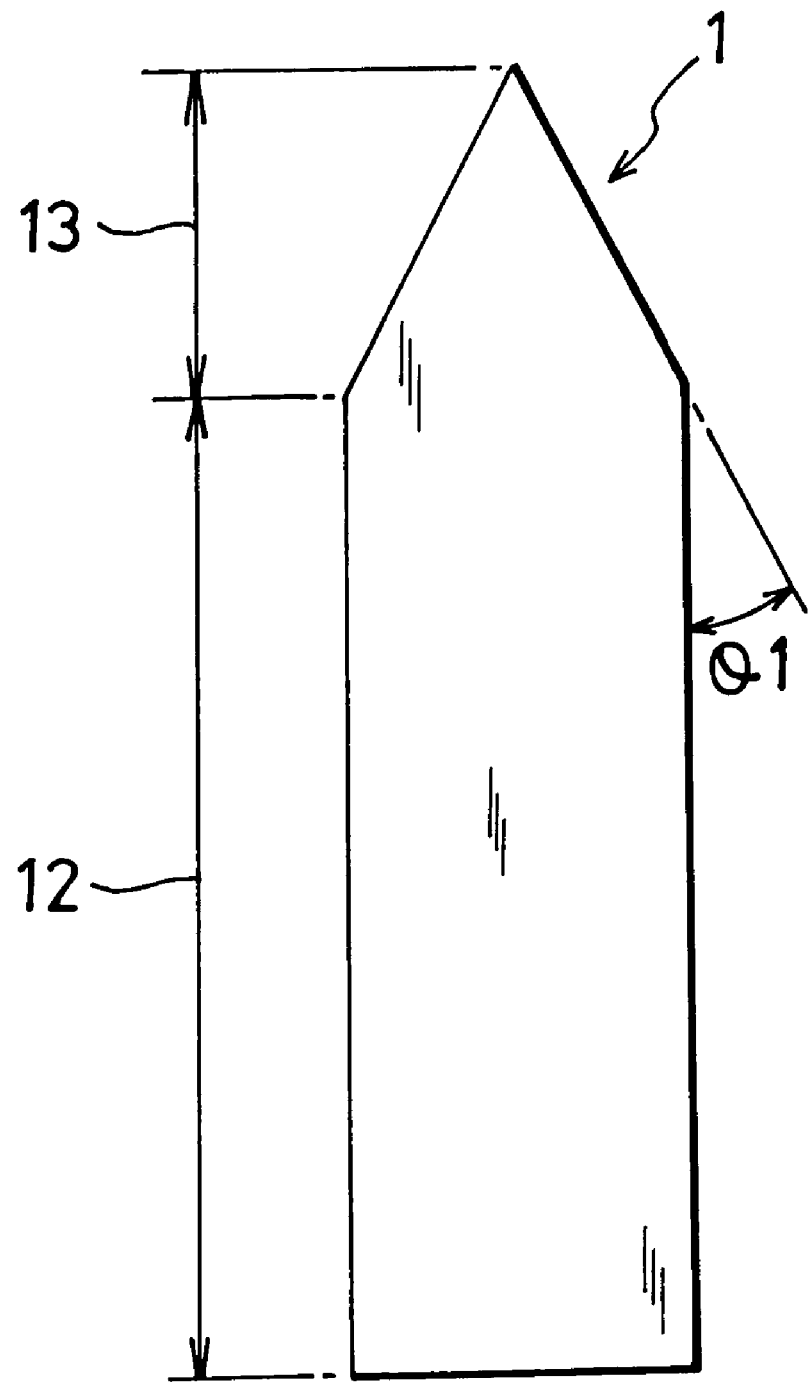
FIG. 13 is an enlarged front view of the band blade.

The bending mechanism 72 has a function of bending the band blade 1 into a given shape. As shown in FIG. 11, for example, the bending mechanism 72 is configured by a die 77 having a slit-like opening 76, and a movable member 78 which laterally presses the band blade 1 passed through the opening 76 of the die 77 to bend the band blade. In the figure, the arrow indicates the movement directions of the movable member 78.

Two band-blade cutting tools 2 to which the cutting tool driving mechanism 6 is coupled are arranged in tandem. The band-blade cutting tools 2 are distributedly placed in the front and rear sides while their front and back sides are oppositely directed, so that the cut parts of the blade portion 13 which are cut by the miter-cutting portions M of the tools are oppositely inclined. The front band-blade cutting tool 2 is placed in front of the bending mechanism 72, and the rear front band-blade cutting tool 2 is placed in rear of the bending mechanism 72. The front and rear band-blade cutting tools 2 are attached to an elevation driving mechanism 21 which raises and lowers the tools, so that, when the tools are to be used, the tools are lowered with respect to the movement path of the band blade 1 to cut the bridge 14 of the band blade 1, and, when the tools are not to be used, the tools are retracted to a space above the movement path of the band blade 1. In this case, as required, the elevation driving mechanism 21 functions so as to selectively place the front and rear band-blade cutting tools 2 in a position suitable for conducting miter cutting which has been described with reference to FIGS. 5A and 5B, or that suitable for straight cutting which has been described with reference to FIGS. 6A and 6B.

The bridge punching mechanism 71 is placed in the rear of the band-blade cutting tool 2 which is disposed in the rear side. The bridge punching mechanism 71 has a function of applying punching to the ridge portion 12 of the band blade 1 to form the bridge 14 in the ridge portion 12. As the bridge punching mechanism 71, for example, a mechanism may be preferably used which comprises a female mold that is to be placed on one side of the band blade 1, and a male mold that is to be placed on the other side, and in which the male mold is pushed so as to conduct the punching step. The bridge punching mechanism 71 is attached to an elevation driving mechanism 71A which raises and lowers the bridge punching mechanism, so that, when the mechanism is to be used, the mechanism is lowered to apply punching to the band blade 1, and, the mechanism is not to be used, the mechanism is retracted to an upper space.

Each of the elevation driving mechanisms 21 and 71A may be configured by a screw shaft which is rotated forward and rearward at a fixed position, and a nut member which is screwed with the screw shaft. In this case, the bridge punching mechanism 71 or the band-blade cutting tools 2 are attached to the nut member. In the band-blade working apparatus 7 of FIG. 10, all control items such as the feed timing, direction, and amount of the band blade 1, the raising and lowering timings and the operation timing of the bridge punching mechanism 71, the raising and lowering timings and the operation timing of the band-blade cutting tools 2, and the operation timing of the bending mechanism 72 can be correctly controlled by a computer. When such a computer control is employed, working which is required to be applied on the band blade 1 used as a Thomson blade is automatically conducted.

Figure 16A:
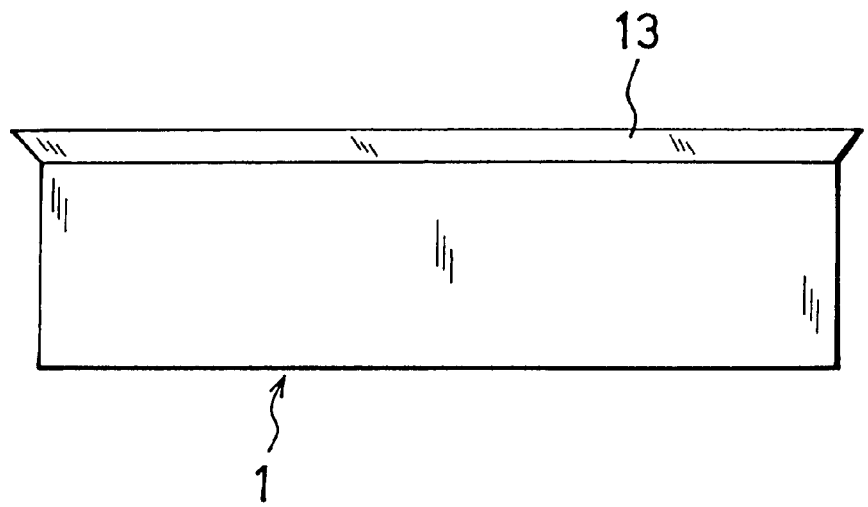
FIG. 16A is a side view of a band blade in which both ends are miter-cut.
Figure 16B:
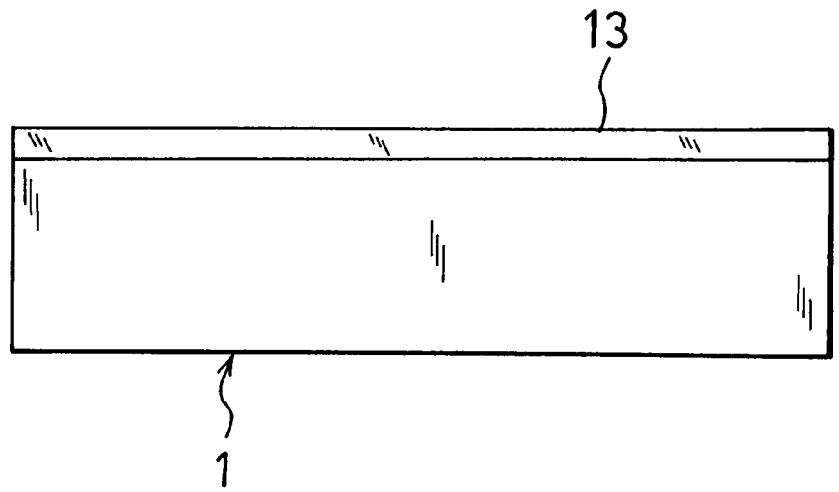
FIG. 16B is a side view of a band blade in which both ends are straight-cut.

In the band-blade working apparatus, the front and rear band-blade cutting tools 2 are distributedly placed in the front and rear sides while their front and back sides are oppositely directed, so that the cut parts of the blade portion 13 of the band blade 1 which are cut by the miter-cutting portions M of the tools are oppositely inclined. By selectively using the front and rear band-blade cutting tools 2, therefore, miter cutting is performed, for example, so as to produce the band blade 1 in which, as shown in FIG. 16A, the front end of the blade portion 13 is forward protruded and the rear end of the blade portion 13 is rearward protruded. Alternatively, the band blade 1 in which, as shown in FIG. 16B, both the front and rear ends are straight cut may be produced, or a band blade in which one of the front and rear ends is miter cut and the other end is straight cut may be produced. Since the configuration in which the front and rear band-blade cutting tools 2 are distributedly placed in front and rear sides of the bending mechanism 72 is employed, a miniature band-blade working apparatus can be provided. After a bending work is once conducted by the bending mechanism 72, the band blade 1 cannot be retracted to the rear of the bending mechanism 72. However, the band blade 1 which has been bent can be cut by using the front band-blade cutting tool 2 and without retracting the band blade to the rear of the bending mechanism 72. Since the bridge punching mechanism 71 is placed in rear of the rear band-blade cutting tool 2, the band-blade working apparatus can be miniaturized. When the bridge 14 is formed in the band blade 1 by the bridge punching mechanism 71 and cutting by the band-blade cutting tool 2 is performed on the place of the bridge 14, there arises an advantage that the band blade can be easily cut.

What is claimed is:

1. A band-blade cutting tool which is used for cutting a band blade having a blade portion, comprising:
a pair of edged members which are opened and closed; cutting blades which are respectively disposed on said pair of edged members so that in an opened position the pair of cutting blades define a mouth; miter-cutting portions which are respectively disposed on said cutting blades to obliquely crossly cut a blade portion of a band blade said miter cutting portions having obliquely arranged surfaces which compliment one another; and straight-cut portions which are respectively disposed on said cutting blades to straight cut the blade portion in a width direction of the band blade, said miter-cutting portions having tying parts which are inclined to form a V within the mouth of the cutting blades in its opened position for cutting obliquely crossly a portion of a blade portion of a band blade, and linear parts continuous with said tying p art s for cutting straight end portions of a bridge of the band blade.

2. A band-blade cutting tool according to claim 1, wherein, in each of said cutting blades, said miter-cutting portion and said straight-cut portion are continuously formed in adjacent places of said cutting blade.

3. A band-blade cutting tool according to claim 2, wherein arm portions are continuously integrated with said pair of edged members, respectively, said arm portions are swingably coupled to each other via a support shaft in places where said arm portions are continuously integrated with said edged members, and a cutting tool driving mechanism which opens and closes said pair of edged members about said support shaft via said arm portions is coupled to a free end portion of each of said arm portions.

4. A band-blade cutting tool according to claim 3, wherein said cutting tool driving mechanism has a rotating cam, and sliding members which are respectively disposed on said free end portions of said arm portions and correspond to said rotating cam.

5. A band-blade working apparatus which is used for cutting and bending a band blade having a blade portion, comprising:

a bending mechanism which bends a band blade;

a band-blade cutting tool which cuts the band blade;

a pair of edged members which are disposed in said band-blade cutting tool and which are opened and closed;

cutting blades which arc respectively disposed on said pair of edged members so that in an opened position the pair of cutting blades define a mouth;

miter-cutting portions which are disposed on said cutting blades, respectively, to obliquely crossly cut a blade portion of a band blade, said miter cutting portions having obliquely arranged surfaces which compliment one another, and straight cut a ridge portion of the band blade from a root portion of a cut part of the blade portion in a width direction of the band blade; and straight-cutting portions which are formed continuously with said miter-cutting portions and disposed on said cutting blades, respectively, to straight cut the blade portion and ridge portion in the width direction, said miter-cutting portions further having tying parts which are inclined to form a V within the mouth of the pair of cutting blades in its opened position for cutting obliquely crossly a portion of a blade portion of a band blades, and linear parts continuous with said tying parts for cutting straight end portions of a bridge of the band blade.

6. A band-blade working apparatus according to claim 5, wherein said apparatus comprises a pair of band-blade cutting tools, said band-blade cutting tools are distributedly placed in front and rear sides so that cut parts of the blade portion which is cut by said miter-cutting portions are oppositely inclined, and at least a front one of said band-blade cutting tools is placed in front of said bending mechanism.

7. A band-blade working apparatus according to claim 5, wherein said bending mechanism has a slit-like opening through which the band blade is to be passed, and a movable member which laterally presses the band blade passed through said opening to bend the band blade.

8. A band-blade working apparatus according to claim 6, wherein said pair of band-blade cutting tools are distributedly placed in front and rear sides of said bending mechanism.

9. A band-blade working apparatus according to claim 8, wherein a bridge punching mechanism which applies punching to the ridge portion of the band blade to form a bridge in the ridge portion is placed in rear of said band-blade cutting tool which is placed in the rear side.

10. A band-blade working apparatus according to claim 5, wherein said apparatus further comprises a reciprocal driving mechanism which extracts and retracts the band blade in an anteroposterior direction.

11. A band-blade working apparatus according to claim 10, wherein said apparatus further comprises an elevation driving mechanism which raises and lowers said pair of front and rear band-blade cutting tools with respect to a movement path of the band blade that is extracted and retracted by said reciprocal driving mechanism.

12. A band-blade working apparatus according to claim 11, wherein said elevation driving mechanism has a function of positioning said miter-cutting portions of said pair of front and rear band-blade cutting tools with respect to the movement path of the band blade, and a function of positioning said straight-cutting portions of said band-blade cutting tools.

13. A band-blade working apparatus according to claim 9, wherein a chute which recovers cut pieces of the band blade is disposed below said band-blade cutting tool which is placed in the rear side, and said bridge punching mechanism.

* * * * *

UNITED STATES PATENT AND TRADEMARK OFFICE
CERTIFICATE OF CORRECTION

PATENT NO. : 6,227,026 B1
DATED : May 8, 2001
INVENTOR(S) : Suehiro Mizukawa

Page 1 of 1

It is certified that error appears in the above-identified patent and that said Letters Patent is hereby corrected as shown below:

Claim 1, column 9,
Line 2, "further" should be inserted between "portions" and "having";
Line 3, "pair of" should be inserted between "the" and "cutting"; and
Line 6, "p arts" should be "parts".

Claim 5, column 10,
Line 3, "blades" should be "blade".

Signed and Sealed this

Thirtieth Day of October, 2001

Attest:

NICHOLAS P. GODICI
Attesting Officer
Acting Director of the United States Patent and Trademark Office